(No Model.)

W. GRAY.
DEVICE FOR THROWING BELTS ONTO OR OFF FROM REVOLVING PULLEYS.

No. 248,587. Patented Oct. 25, 1881.

Witnesses.
Chas. L. Burdett.
Edwin A. Dimock.

Inventor:
William Gray
by Theo. G. Ellis, Attorney

UNITED STATES PATENT OFFICE.

WILLIAM GRAY, OF HARTFORD, CONNECTICUT, ASSIGNOR TO HIMSELF AND AMOS WHITNEY, OF SAME PLACE.

DEVICE FOR THROWING BELTS ONTO OR OFF FROM REVOLVING PULLEYS.

SPECIFICATION forming part of Letters Patent No. 248,587, dated October 25, 1881.

Application filed August 31, 1881. (No model.)

*To all whom it may concern:*

Be it known that I, WILLIAM GRAY, of Hartford, in the county of Hartford and State of Connecticut, have invented certain new and useful Improvements in Devices for Throwing Belts onto or off from Revolving Pulleys; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to a device or tool for throwing a belt onto a revolving pulley, or from one pulley to another of a series of pulleys of different diameters, or to throw a belt off from a revolving pulley, as is frequently required in shops and other places where belts and pulleys are used. The implement ordinarily used for this purpose is a simple pole or stick, or a stick having a pin at or near the end to hold the belt against the stick and prevent it from running off the end when the stick is pressed against the edge of the belt.

The object of my improvement is to provide an implement which can easily and readily move the largest belts, and with much less difficulty and exertion than by the customary means.

Figure 1:
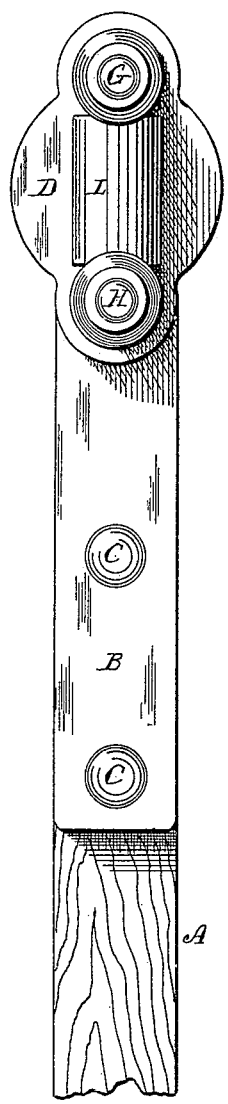
Figure 2:
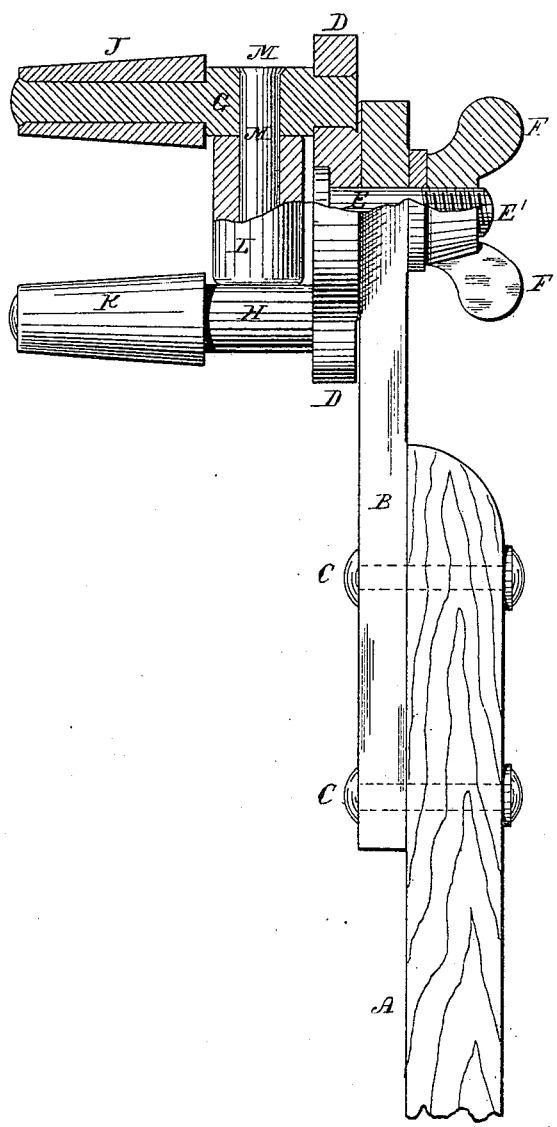

In the accompanying drawings, illustrating my invention, Figure 1 is a front view of my improved device. Fig. 2 is a side view of the same, partly in section, to show the construction.

A is a pole, to which my improved device is attached to reach pulleys which are placed near the ceiling of a room or shop. A part only of this pole is shown, as its length is immaterial to my invention.

B is a metallic shank, which is firmly secured to the pole A by means of the rivets or bolts C C.

D is a plate resting against the shank B, and turning upon a bolt, E, which passes through the shank, and is furnished upon its outer end with the screw-thread E' and the nut F, (shown in the drawings as a thumb-nut,) by which the plate D can be clamped to the shank B and held firmly in position.

G and H are spindles, forming part of the frame of my device, which are riveted or otherwise attached to the plate D. These spindles are turned true at their outer ends, and are furnished with the rollers J and K, which turn freely upon them, and are secured from slipping off by riveting the ends of the spindles, or in any customary manner. The rollers J and K are shown in the drawings as being of a conical form; but they may, if desired, be cylindrical.

L is a third roller, extending across between the spindles G and H and turning upon the axis M, which passes through G and H, and is riveted or otherwise secured in place. The roller L is shown as being cylindrical in the drawings; but it may be made concave, if desired, the exact form of these rollers not being essential to my invention.

The rollers J, K, and L are arranged upon the three sides of a rectangle, and inclose three sides of the space between them, and offer a rolling surface to any object placed within the space inclosed.

The operation of my improved device is as follows: When it is desired to move a belt onto or off from a pulley the belt is placed between the two rollers J and K, and the roller L is pressed forcibly against the edge. The irregular movements of the belt only throw it against the rollers, and it is readily and easily pushed into the desired position. When the belt operated upon runs nearly horizontal the position of the parts is that shown in the drawings relatively to the pole to which the device is attached; but when the belt to be moved runs in a vertical direction the position of the frame carrying the rollers is changed to a direction at right angles to that shown by loosening the clamp-nut F and again clamping it when the position of the rollers has been changed. This clamp allows the plate D to be set at any desired angle with the pole and firmly held.

By means of my improved device belts can be thrown onto or off from any moving pulley, or if the belt be moving and the pulley stopped, with perfect ease and safety.

What I claim as my invention is—

1. The frame D G H, adapted to carry the rollers J K L, in combination with said rollers and a supporting-pole, substantially as described.

2. The combination of a frame, arranged on three sides of a rectangle, with the rollers J K L, substantially as described.

3. The combination of the frame D G H, provided with the rollers J K L, arranged as described, the shank B, and the clamping device E F, substantially as described.

WILLIAM GRAY.

Witnesses:
THEO. G. ELLIS,
W. MARSH.